(12) United States Patent
Millspaugh

(10) Patent No.: US 11,414,210 B2
(45) Date of Patent: Aug. 16, 2022

(54) GROUND SUPPORT EQUIPMENT FOR A HIGH ALTITUDE LONG ENDURANCE AIRCRAFT

(71) Applicant: AEROVIRONMENT, INC., Arlington, VA (US)

(72) Inventor: Tom Millspaugh, Westlake Village, CA (US)

(73) Assignee: AEROVIRONMENT, INC., Arlington, VA (US)

( * ) Notice: Subject to any disclaimer, the term of this patent is extended or adjusted under 35 U.S.C. 154(b) by 0 days.

(21) Appl. No.: 17/605,738

(22) PCT Filed: Apr. 23, 2020

(86) PCT No.: PCT/US2020/029647
§ 371 (c)(1),
(2) Date: Oct. 22, 2021

(87) PCT Pub. No.: WO2021/011045
PCT Pub. Date: Jan. 21, 2021

(65) Prior Publication Data
US 2022/0144452 A1 May 12, 2022

Related U.S. Application Data

(60) Provisional application No. 62/855,605, filed on May 31, 2019, provisional application No. 62/838,833, (Continued)

(51) Int. Cl.
*B64F 1/22* (2006.01)
*B64C 25/32* (2006.01)
*B64C 39/02* (2006.01)

(52) U.S. Cl.
CPC .............. *B64F 1/224* (2013.01); *B64C 25/32* (2013.01); *B64C 39/024* (2013.01); *B64C 2201/208* (2013.01)

(58) Field of Classification Search
CPC .... B64F 1/224; B64F 1/22; B64F 5/10; B64F 5/50; B64C 25/32; B64C 39/024; B64C 2201/208; Y10T 29/49829; Y10S 269/909
See application file for complete search history.

(56) References Cited

U.S. PATENT DOCUMENTS 2,405,544 A * 8/1946 Anjeskey ................. B64F 5/10
212/331
2,431,589 A * 11/1947 Shuler, Jr. ................. B66F 9/12
254/133 R
(Continued)

FOREIGN PATENT DOCUMENTS

AU          2007200943 A1     9/2007

OTHER PUBLICATIONS

International Search Report for PCT/US20/29647 dated Feb. 2, 2021.

*Primary Examiner* — Medhat Badawi
(74) *Attorney, Agent, or Firm* — Concept IP LLP; Pejman Yedidsion; Eric Aagaard

(57) ABSTRACT

Systems, devices, and methods for a ground support system for an unmanned aerial vehicle (UAV) including: at least one handling fixture, where each handling fixture is configured to support at least one wing panel of the UAV; and at least one dolly, where each dolly is configured to receive at least one landing pod of the UAV, and where each landing pod supports at least one wing panel of the UAV; where the at least one handling fixture and the at least one dolly are configured to move and rotate two or more wing panels to align the two or more wing panels with each other for assembly of the UAV; and where the at least one dolly further allows for transportation of the UAV over uneven terrain.

20 Claims, 15 Drawing Sheets

Related U.S. Application Data filed on Apr. 25, 2019, provisional application No. 62/838,783, filed on Apr. 25, 2019.

(56) References Cited

U.S. PATENT DOCUMENTS

| | | | | |
|---|---|---|---|---|
| 2,712,874 A * | 7/1955 | Murray | B60P 3/11 | 254/1 OR |
| 2,815,132 A * | 12/1957 | Stone | B62B 3/108 | 254/387 |
| 3,012,737 A * | 12/1961 | Dodd | B64C 37/00 | 244/2 |
| 3,306,578 A * | 2/1967 | Meeks | B66B 9/16 | 269/68 |
| 3,640,491 A * | 2/1972 | Harrison | B64C 1/00 | 244/131 |
| 3,671,013 A * | 6/1972 | Everson, Jr | B64F 1/222 | 254/8 R |
| 4,269,374 A * | 5/1981 | Miller | B64C 37/00 | 244/49 |
| 4,440,265 A * | 4/1984 | Spagnoli | B64F 5/50 | 182/141 |
| 4,461,455 A * | 7/1984 | Mills | B64F 5/50 | 180/125 |
| 4,810,151 A * | 3/1989 | Shern | E04F 21/0023 | 414/11 |
| 5,175,712 A | 12/1992 | Vaccaro et al. | | |
| 5,383,758 A * | 1/1995 | Patrick | B66F 9/061 | 414/10 |
| 5,662,315 A * | 9/1997 | Neiss | B62B 3/10 | 269/17 |
| 6,024,348 A * | 2/2000 | Ventura | B05B 13/0285 | 269/104 |
| 6,314,630 B1 * | 11/2001 | Munk | B25B 5/163 | 29/469 |
| 6,808,143 B2 * | 10/2004 | Munk | B23P 21/00 | 244/131 |
| 6,979,288 B2 * | 12/2005 | Hazlehurst | B23Q 16/00 | 408/1 R |
| 7,319,738 B2 * | 1/2008 | Lasiuk | G01N 23/04 | 378/198 |
| 7,461,711 B2 * | 12/2008 | McCrary | B64F 5/50 | 244/50 |
| 7,874,053 B2 * | 1/2011 | Stangel | B65D 90/008 | 29/402.09 |
| 7,917,242 B2 * | 3/2011 | Jones | B64F 5/10 | 700/62 |
| 8,005,563 B2 * | 8/2011 | Cobb | B64F 5/10 | 700/60 |
| 8,020,816 B2 * | 9/2011 | Laitila | F16M 13/00 | 248/125.7 |
| 8,066,267 B2 * | 11/2011 | Schaerer | B05B 13/0285 | 269/296 |
| 8,141,819 B2 * | 3/2012 | Brock | B64C 39/024 | 244/123.8 |
| 8,262,050 B2 * | 9/2012 | Linz | B66C 17/06 | 244/54 |
| 8,661,684 B1 * | 3/2014 | Boyd | B21D 53/92 | 29/897.2 |
| 9,126,698 B2 * | 9/2015 | Spinazze | B64F 5/50 | |
| 9,486,917 B2 * | 11/2016 | Reid | B25J 11/005 | |
| 9,708,079 B2 * | 7/2017 | DesJardien | B25J 15/0491 | |
| 9,776,330 B2 * | 10/2017 | Day | B64F 5/10 | |
| 9,895,741 B2 * | 2/2018 | Oberoi | B64F 5/10 | |
| 9,957,064 B2 * | 5/2018 | Miller | B64F 1/06 | |
| 10,017,277 B2 * | 7/2018 | DesJardien | B64F 5/10 | |
| 10,391,543 B2 * | 8/2019 | Boyd | B64C 3/00 | |
| 10,407,087 B1 * | 9/2019 | Baker | B62B 3/005 | |
| 10,427,254 B2 * | 10/2019 | Day | B23P 21/004 | |
| 10,640,297 B2 * | 5/2020 | Kilibarda | B65G 35/06 | |
| 10,894,617 B2 * | 1/2021 | Liaqat | B25B 11/02 | |
| 10,907,764 B2 * | 2/2021 | Waller | F16M 11/42 | |
| 10,982,805 B2 * | 4/2021 | Burton | F16M 11/24 | |
| 11,180,264 B2 * | 11/2021 | Best | G01M 17/007 | |
| 2003/0183451 A1 * | 10/2003 | Huang | B66F 7/22 | 182/141 |
| 2005/0044700 A1 * | 3/2005 | Ghuman | B23Q 1/52 | 29/791 |
| 2005/0116105 A1 * | 6/2005 | Munk | B64F 5/10 | 244/123.8 |
| 2006/0266885 A1 * | 11/2006 | Hardaker | B64F 5/50 | 244/119 |
| 2007/0131103 A1 * | 6/2007 | McClellan | F41H 5/12 | 89/37.03 |
| 2009/0236470 A1 * | 9/2009 | Goossen | B64C 39/024 | 244/115 |
| 2010/0217437 A1 * | 8/2010 | Sarh | B64F 5/10 | 700/248 |
| 2011/0000082 A1 * | 1/2011 | Yamashita | B23Q 7/04 | 29/791 |
| 2011/0024587 A1 * | 2/2011 | Tsai | F16M 13/00 | 248/206.2 |
| 2011/0054694 A1 * | 3/2011 | Munk | B64F 5/10 | 700/275 |
| 2012/0216384 A1 * | 8/2012 | Immekus | B23P 21/004 | 29/428 |
| 2012/0273631 A1 * | 11/2012 | Deros | F16M 11/32 | 248/122.1 |
| 2013/0158697 A1 * | 6/2013 | Stone | B64F 5/50 | 29/897 |
| 2014/0001318 A1 * | 1/2014 | Ehrenleitner | B25J 17/0266 | 248/122.1 |
| 2014/0353894 A1 * | 12/2014 | DesJardien | B64F 5/10 | 269/21 |
| 2015/0115106 A1 | 4/2015 | Coffey et al. | | |
| 2015/0266575 A1 * | 9/2015 | Borko | B64F 1/222 | 244/17.23 |
| 2016/0257426 A1 * | 9/2016 | Mozer | B64F 1/362 | |
| 2017/0120443 A1 * | 5/2017 | Kang | B25J 5/007 | |
| 2017/0144776 A1 * | 5/2017 | Fisher | B64F 1/24 | |
| 2018/0099764 A1 * | 4/2018 | Schill | B64F 1/22 | |
| 2018/0305191 A1 * | 10/2018 | Renquist | B66F 7/28 | |
| 2020/0094991 A1 * | 3/2020 | Datas | B64C 1/069 | |
| 2020/0101571 A1 * | 4/2020 | Datas | B64F 5/50 | |
| 2020/0172267 A1 * | 6/2020 | Darbonville | B64F 5/10 | |

* cited by examiner

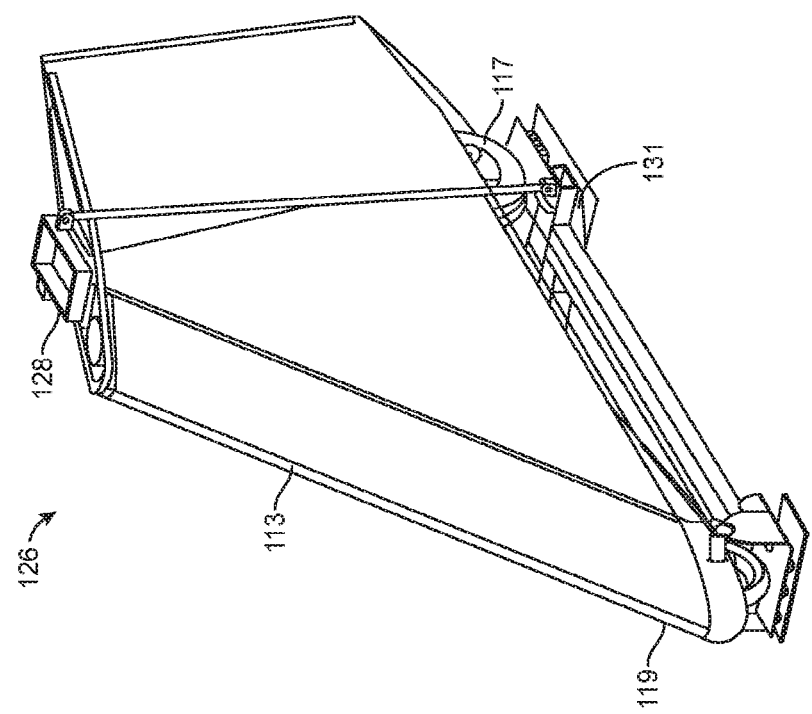
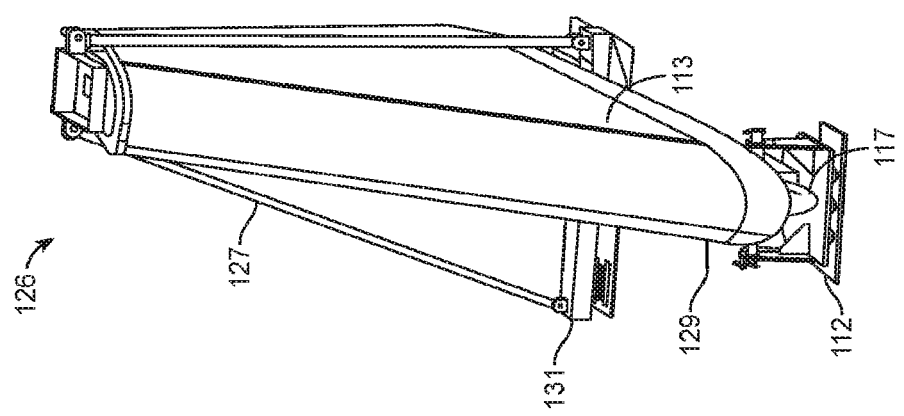
FIG. 3B
FIG. 3A

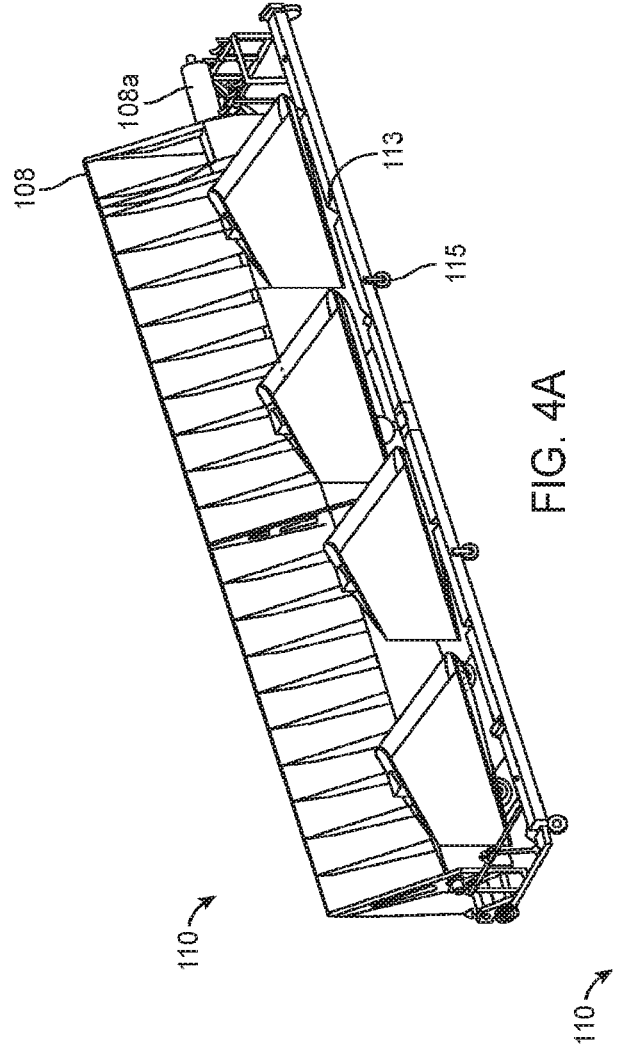
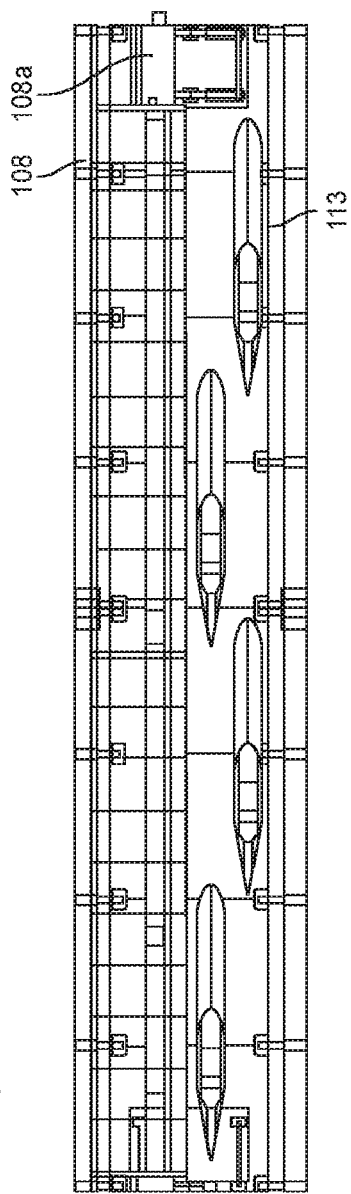
FIG. 4A
FIG. 4B

GROUND SUPPORT EQUIPMENT FOR A HIGH ALTITUDE LONG ENDURANCE AIRCRAFT

CROSS-REFERENCE TO RELATED APPLICATION

This application is a 35 U.S.C § 371 National Stage Entry of International Application No. PCT/US2020/029647, filed Apr. 23, 2020, which claims priority to and the benefit of U.S. Provisional Patent Application No. 62/838,783, filed Apr. 25, 2019, U.S. Provisional Patent Application No. 62/838,833, filed Apr. 25, 2019, and U.S. Provisional Patent Application No. 62/855,605, filed May 31, 2019, the contents of all of which are hereby incorporated by reference herein for all purposes.

FIELD OF ENDEAVOR

The invention relates generally to unmanned aerial vehicles (UAVs), and more particularly to ground support systems for UAVs.

BACKGROUND

Unmanned aerial vehicles (UAVs), such as a high altitude long endurance aircraft, are lightweight planes that are capable of controlled, sustained flight. Some UAVs are large and need to be safely transported to a distant location. During transportation the aircraft will likely travel over uneven surfaces that could potentially damage the aircraft.

SUMMARY

A ground support system embodiment for an unmanned aerial vehicle (UAV) may include: at least one handling fixture, where each handling fixture may be configured to support at least one wing panel of the UAV; and at least one dolly, where each dolly may be configured to receive at least one landing pod of the UAV, and where each landing pod supports at least one wing panel of the UAV; where the at least one handling fixture and the at least one dolly may be configured to move and rotate two or more wing panels to align the two or more wing panels with each other for assembly of the UAV; and where the at least one dolly further allows for transportation of the UAV over uneven terrain.

In additional ground support system embodiments, each handling fixture may be fitted to a wing panel spar of the at least one wing panel. In additional ground support system embodiments, the at least one handling fixture may further include: one or more wheels attached to a base, where the one or more wheels allow each wing panel to be moved around for attachment to another wing panel. In additional ground support system embodiments, the at least one handling fixture may further include: one or more legs attached to the base, where the one or more legs may be configured to engage with at least one transportation fixture for transporting the UAV, where each transportation fixture may be configured to load and unload wing panels into a shipping fixture.

In additional ground support system embodiments, the at least one handling fixture allows each wing panel to rotate 360 degrees relative to a ground level. In additional ground support system embodiments, the at least one handling fixture may be height-adjustable to raise or lower the wing panel of the UAV to a desired working height relative to a ground level. In additional ground support system embodiments, the UAV may be secured to the at least one dolly via the at least one landing pod of the UAV.

Additional ground support system embodiments may further include: a yoke; and a winch connecting the yoke to the dolly, where the UAV may be prevented from flying via an attachment of the yoke proximate a nose of the landing pod. In additional ground support system embodiments, the UAV may be further prevented from flying based on a ballast weight of the UAV.

Additional ground support system embodiments may further include: a lift tray of the dolly, where the lift tray cradles the landing pod to further prevent flying of the UAV. In additional ground support system embodiments, the lift tray can lower or raise relative to a ground level. Additional ground support system embodiments may further include: a rear gate of the dolly, where the rear gate opens for the winch to pull the landing pod into the lift tray via the yoke, and where the rear gate closes to secure the landing pod in the lift tray. In additional ground support system embodiments, the lift tray positions the wing panel of the UAV at a first pitch angle, where the UAV maintains a second pitch angle during flight, where the first pitch angle may be greater than the second pitch angle, and where the first pitch angle decreases a chance that the UAV will unintentionally take flight. In additional ground support system embodiments, the first pitch angle would cause the UAV to stall if the UAV takes off unintentionally. In additional ground support system embodiments, the first pitch angle may be about 14°, and where the second pitch angle may be about 10°.

Additional ground support system embodiments may further include: at least one interconnect frame connected between each dolly, where each interconnect frame stabilizes the UAV after assembly and during transportation of the UAV. Additional ground support system embodiments may further include: a towing frame connector configured to connect to the at least one interconnect frame, where the towing frame connector may be configured to connect to a vehicle such that the vehicle can tow the UAV to a runway site.

In additional ground support system embodiments, the UAV may be towed sideways by the vehicle. In additional ground support system embodiments, the UAV may be towed by the vehicle in a first direction, where the first direction may be perpendicular to a forward direction of flight of the UAV, and where towing in the first direction decreases a chance that the UAV will unintentionally take flight. Additional ground support system embodiments may further include: a wind fence attached to the vehicle, where the wind fence comprises a porous screen that protects the UAV from high winds during towing and allows for faster towing speeds.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which:

FIG. 3A depicts a perspective view of an isolator frame associated with the transportation fixture of FIG. 2, according to one embodiment;

FIG. 3B depicts a side perspective view of the isolator frame of FIG. 3A, according to one embodiment;

FIG. 4A depicts a perspective view of a transportation fixture for the unmanned aerial vehicle of FIG. 1, according to one embodiment;

FIG. 4B depicts a plan view of the transportation fixture of FIG. 4A, according to one embodiment;

DETAILED DESCRIPTION

Figure 1:
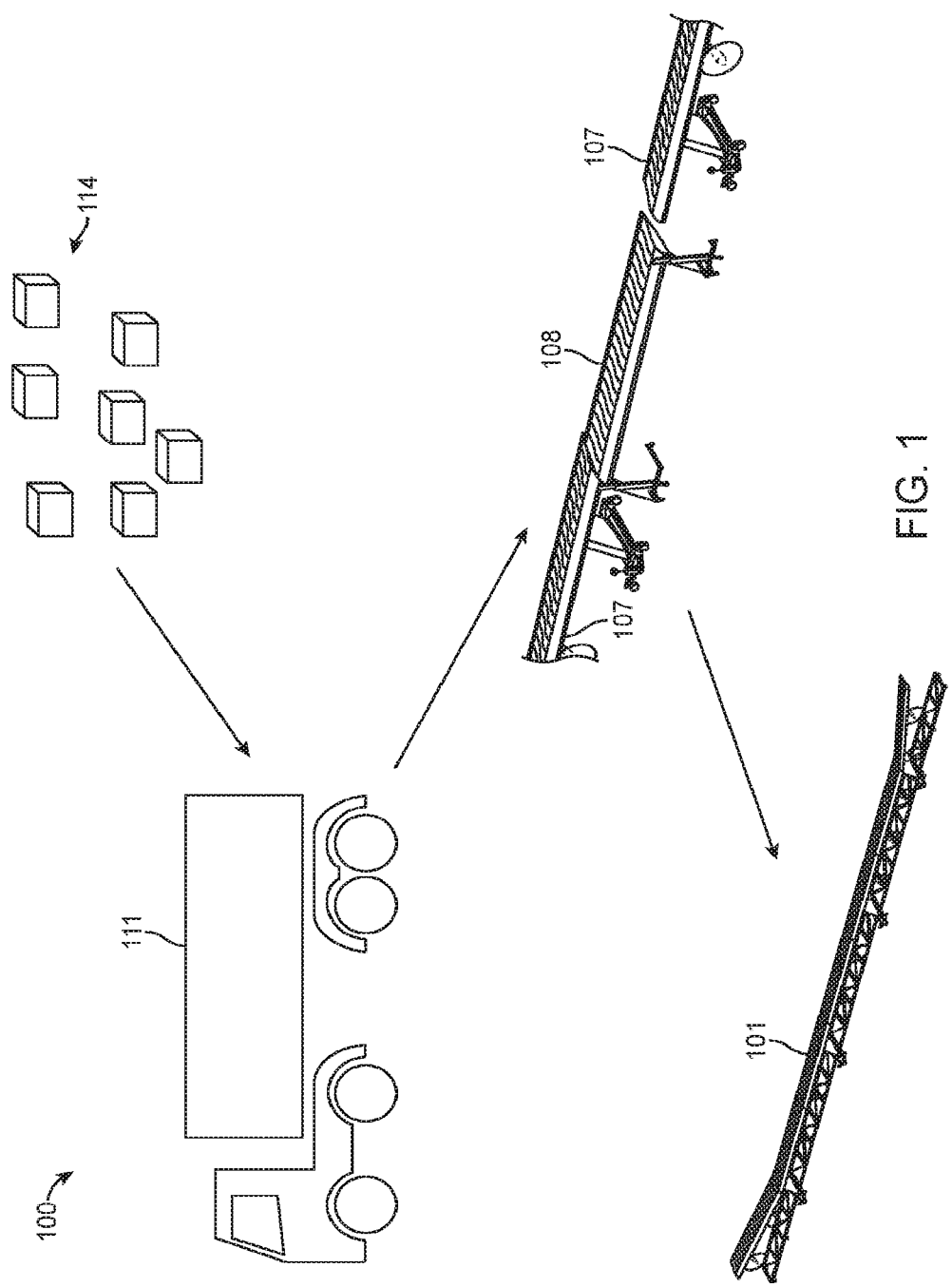
FIG. 1 depicts a system for ground support of an unmanned aerial vehicle, according to one embodiment.

The following description is made for the purpose of illustrating the general principles of the embodiments discloses herein and is not meant to limit the concepts disclosed herein. Further, particular features described herein can be used in combination with other described features in each of the various possible combinations and permutations. Unless otherwise specifically defined herein, all terms are to be given their broadest possible interpretation including meanings implied from the description as well as meanings understood by those skilled in the art and/or as defined in dictionaries, treatises, etc.

A system embodiment may include a ground support system for an unmanned aerial vehicle (UAV). In one embodiment, the UAV is a high altitude long endurance solar-powered aircraft. The ground support system may include transportation fixtures for safe transportation of constituent components of the UAV. A transportation fixture may transport components of the UAV, such as wing panels, landing pods, and the like, all of which may fit within a shipping container. The pieces of the UAV may be assembled upon safe transport to a take-off site. In one embodiment, a transportation fixture may hold two wing panels of the UAV. In one embodiment, seven panels may be transported: three pairs of wing panels and one center panel. The transportation fixtures may be compact to minimize the logistical footprint and may be capable of rolling over uneven surfaces without causing damage to the UAV. The transportation fixtures are further configured for loading and handling with minimal crew and provide easy access for loading.

In one embodiment, handling fixtures may be integrated into the transportation fixtures. The handling fixtures may be used extensively in the assembly of the UAV. The handling fixtures may have a very simple and versatile configuration. More specifically, handling fixtures may be fitted to the UAV wing panels and the central panel. The handling fixtures may have wheels to safely move the panels around for attachment to one another. The handling fixtures may rotate 360 degrees and may be height-adjustable to accommodate a desired working height. The handling fixtures may further include legs configured to engage with the transport fixtures to load and unload the UAV panels into the shipping containers.

At the take-off site, the UAV may be assembled for flight. The assembled UAV may need to be pulled by a ground transporter, e.g., a dolly, to and from a runway, and the runway may have uneven terrain, such as dirt and grass. Addressing this problem may require enhanced infrastructure to construct a new runway suitable for loads to move over rough terrain, or the construction of a new transportation mechanism entirely. Additionally, the light UAV may want to take off due to its forward movement and air flowing over the wings as the dolly transports the UAV.

In one embodiment, the ground support system may have at least one dolly secured to the UAV. The UAV may sit in the dolly while the UAV is being worked on, such as during engine tests and other diagnostics. The dolly may assist in transporting the UAV to and from the flight field for take-off and landing. The UAV dolly may include a lift mechanism, a tray that lowers and raises, wheels with suspension, and batteries, such as dual lithium batteries under the tray that may run for up to twenty hours without needing to be plugged in. The dolly may also include a winch for pulling the UAV onto the dolly. More specifically, the dolly may have a gate that opens at the rear end of the dolly, wherein the winch is extracted and secured proximate the nose of the UAV in order to pull the UAV onto the dolly. The dolly further comprises a yoke. The ballast weight of the UAV, the shape of the lift tray, and the yoke may hold the UAV to nose wheel to the ground. The dolly may be attached to a vehicle for towing the UAV.

The UAV is large, yet light; therefore, it is important that when the UAV is not airborne the UAV gets attached to the dolly so the UAV does not take flight unexpectedly. Secured as such, the aircraft may not blow away during transportation. Furthermore, the dolly may allow the UAV to be loaded on an incline or decline. The dolly may be constructed to allow the UAV to bend and flex while towing loads over uneven terrain.

In one embodiment, the dolly may transport the UAV on grass and the dolly tires may be substantially wide as to prevent sticking to a grass surface. In one embodiment, the tires may not have treads so as to eliminate and/or reduce the need to inspect every tire for foreign object debris (FOD).

With respect to FIG. 1, a ground support system 100 for an unmanned aerial vehicle (UAV) 101 is depicted. UAVs are aircraft with no onboard pilot. UAVs may fly autonomously or remotely. In one embodiment, the UAV 101 is a high altitude long endurance aircraft. In one embodiment, the UAV 101 may have one or more motors, for example, between one and forty motors, and a wingspan between 100 feet and 400 feet. In one embodiment, the UAV 101 has a wingspan of approximately 260 feet and is propelled by a plurality of motors, for example, ten electric motors, powered by a solar array covering the surface of the wing, resulting in zero emissions. Flying at an altitude of approximately 65,000 feet above sea level and above the clouds, the UAV 101 is designed for continuous, extended missions of up to months without landing.

The UAV 101 functions optimally at high altitude due at least in part to the lightweight payload of the UAV. The UAV 101 is capable of considerable periods of sustained flight without recourse to land. In one embodiment, the UAV 101 may weigh approximately 3,000 lbs and may include a plurality of outer wing panel sections 107 and a center panel 108, providing for efficient assembly and disassembly of the UAV 101 due to the attachability and detachability of the wing panel sections to each other and/or to the center panel. The pieces may be assembled upon safe transport to a take-off site with a truck 111.

Figure 2:
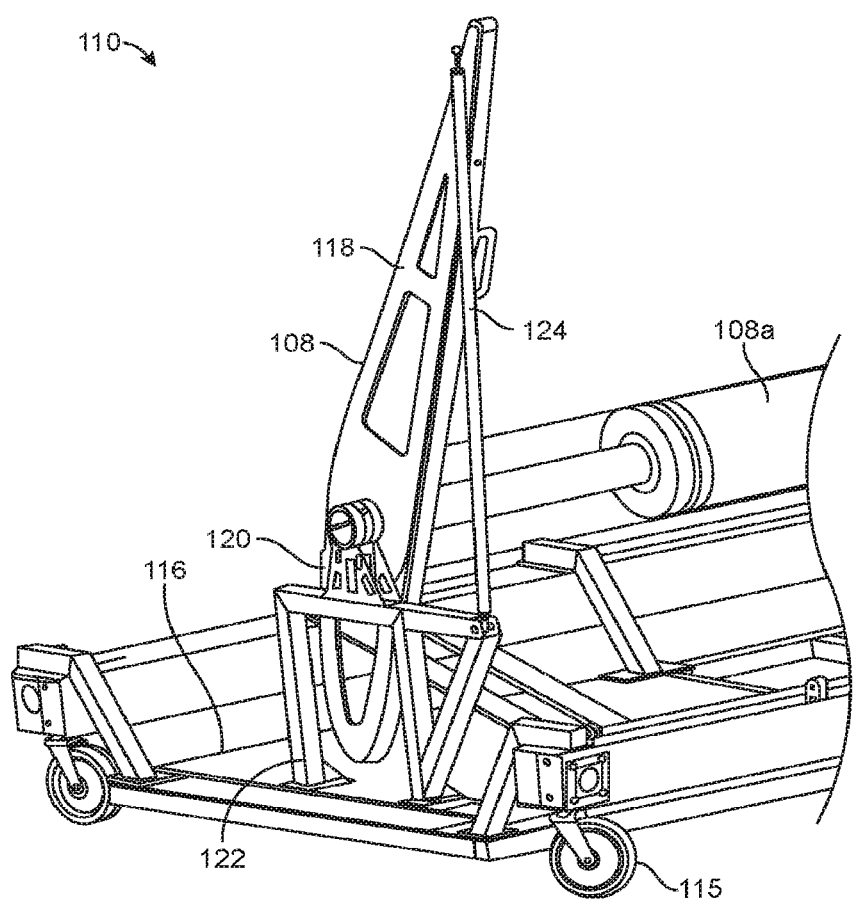
FIG. 2 depicts a portion of a transportation fixture for the unmanned aerial vehicle of FIG. 1, according to one embodiment.

With respect to FIG. 2, a transportation fixture 110 for safe transportation of UAV components to a take-off site is illustrated. In one embodiment, a central panel spar 108a of central panel 108 is seated on a saddle 120 of the transportation fixture 110. The saddle 120 may be connected to a support frame 122 of the transportation fixture 110. In one embodiment, the transportation fixture 110 may have a plurality of wheels 115 for rolling the transportation fixture 110 over a variety of terrains, as well as for easy insertion of the transportation fixture 110 into a shipping container 114 (see FIGS. 1 and 6). In one embodiment, the transportation fixture 110 may have floor plates 116 allowing for crew to walk on the transportation fixture 110. The central panel 108 may have an interface 118 with one end of a transportation fixture strut 124 attached thereto. The opposite end of the transportation fixture strut 124 may be attached to the support frame 122. The transportation fixture strut 124 may help further secure the central panel 108 to the transportation fixture 110 for safe transportation.

With respect to FIGS. 3A and 3B, an isolator frame 126 of the transportation fixture 110 is shown. The isolator frame 126 may allow for safe transportation of landing pods 113. The isolator frame 126 may include a nose wheel pin assembly 112 with a wheel pin 129 for securing a nose 119 of the landing pod 113 to the isolator frame 126. More specifically, the nose 119 may house a wheel 117. The wheel pin 129 may pass through the wheel 117 and fasten to the nose wheel pin assembly 112, securing the nose 119 to the isolator frame 126.

The isolator frame 126 may further include a pair of support rods 127 connected to a stabilizer frame 128 at one end of the support rod 127. The landing pod 113 may fit over and around the stabilizer frame 128. A pair of support rods 127 may be further connected to a support base 131 at the opposite end of the support rods 127.

With respect to FIG. 4A, the transportation fixture 110 with the central panel 108 and the landing pods 113 is illustrated. FIG. 4B depicts the same central panel 108 and landing pods 113 from a top, plan view. In one embodiment, the transportation fixtures 110 are made of a semi-rigid material such as carbon fiber, titanium, or aluminum. The transportation fixtures 110 may isolate the UAV 101 components from normal highway shipping loads.

Figure 5:
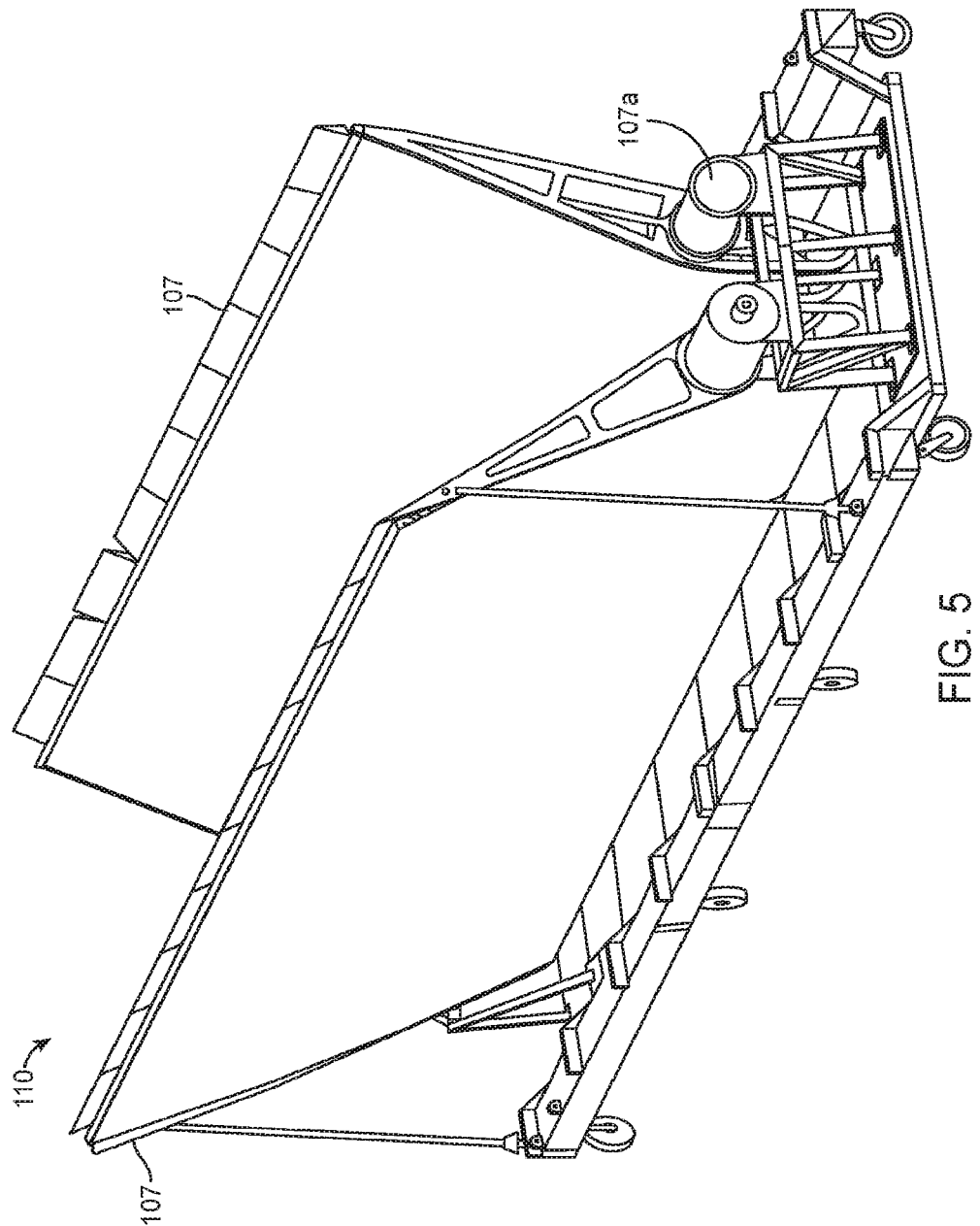
FIG. 5 depicts a transportation fixture for transporting two wing panels of the unmanned aerial vehicle of FIG. 1, according to one embodiment.

With respect to FIG. 5, the transportation fixture 110 may hold two wing panels 107 and the two wing panel spars 107a of the wing panels 107 may seat securely in the transportation fixture 110.

Figure 6:
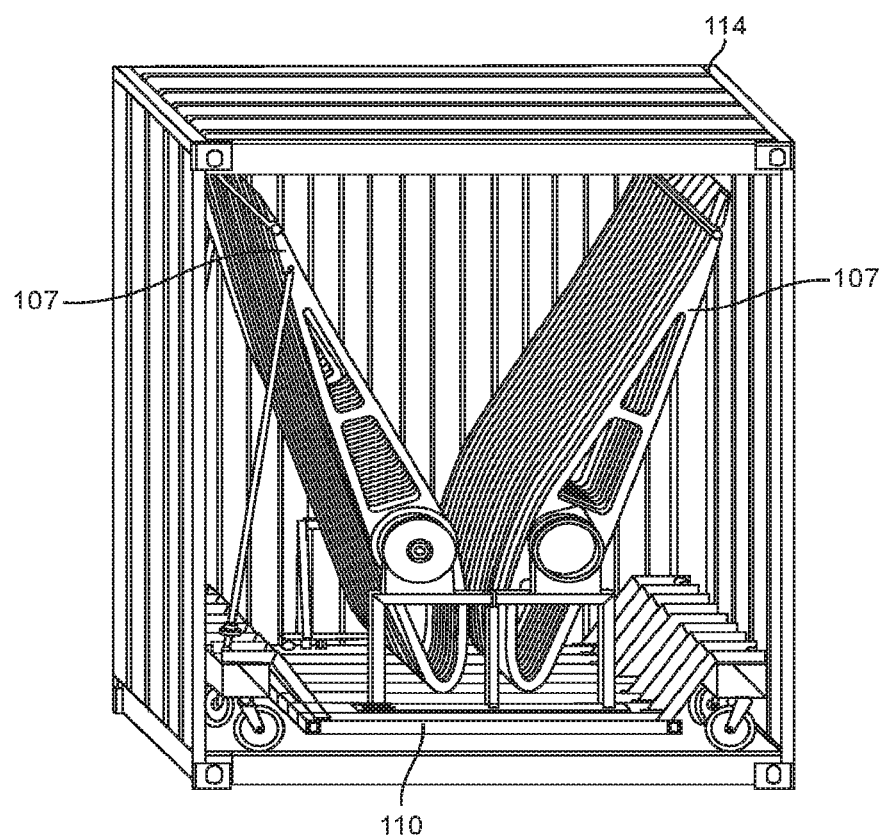
FIG. 6 depicts a shipping container for the transportation fixture of FIG. 5, according to one embodiment.

With respect to FIG. 6, the wing panels may fit within the shipping container 114. In one embodiment, the shipping container 114 is 40 feet in length. In one embodiment, the shipping container 114 is a Conex container.

Figure 9A:
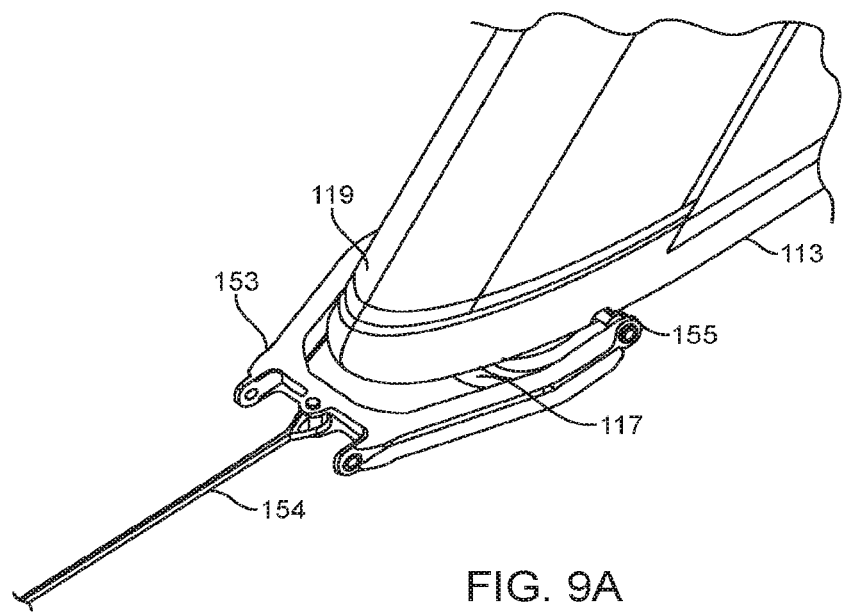
FIG. 9A depicts a yoke of the dolly of FIG. 8A connected to the landing pod of FIG. 8B, according to one embodiment.
Figure 9B:
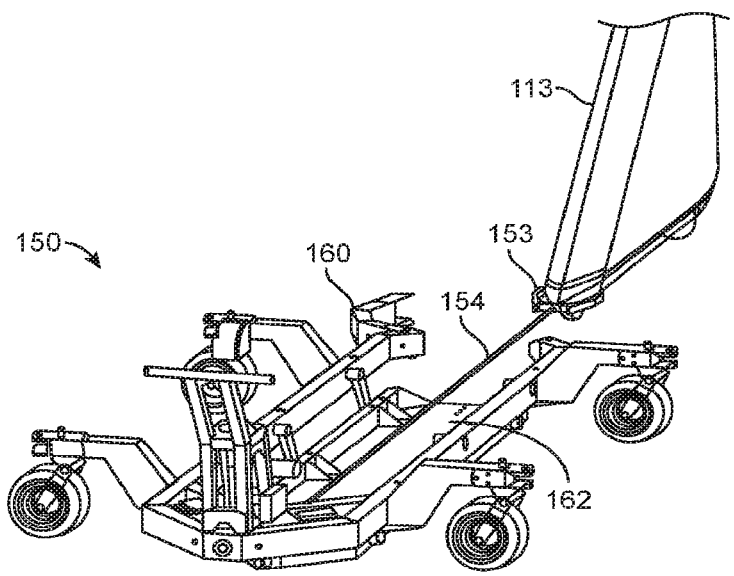
FIG. 9B depicts a process for securing the landing pod of FIG. 8B to the dolly of FIG. 8A, according to one embodiment.

The transportation fixtures 110 may be compact to minimize the logistical footprint, and may be capable of rolling over uneven surfaces without causing damage to the UAV 101. The transportation fixtures 110 may be further configured for loading and handling with minimal crew and provide easy access for loading into the shipping containers 114. The shipping containers 114 may be loaded onto the truck 111 for transportation to a runway site 104 (see FIGS. 9 and 10).

Figure 7:
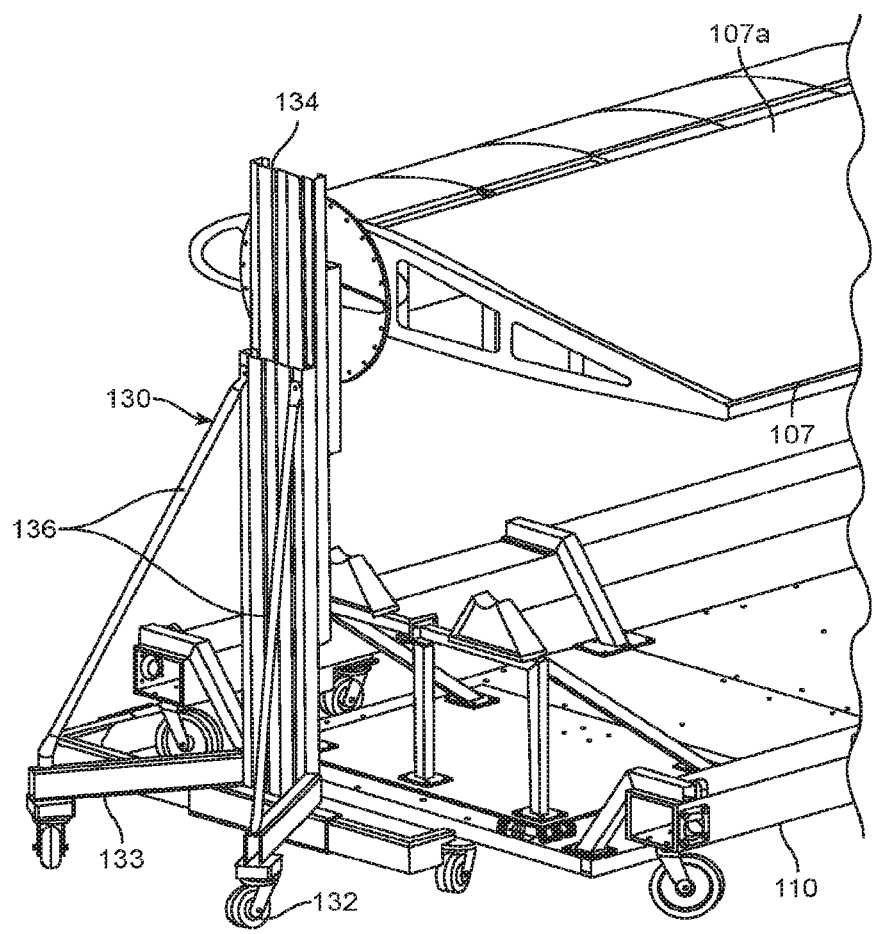
FIG. 7 depicts a handling fixture connected to the transportation fixture of FIG. 2, according to one embodiment.

Upon arrival at the runway site 104, handling fixtures 130 may be integrated into the transportation fixtures 110 for use in the assembly of the UAV 101, as shown in FIG. 7. More specifically, handling fixtures 130 are fitted to the wing panels 107. In one embodiment, the handling fixtures 130 are fitted to the wing panel spars 107a of the wing panels 107. In another embodiment, the handling fixtures 130 are fitted to the central panel 108. The handling fixtures 130 have wheels 132 attached to a base 133 to safely move the wing panels 107 around for attachment to one another or to the central panel 108. The handling fixtures 130 may allow the panels 107, 108 to rotate 360 degrees. In one embodiment, the handling fixtures 130 are height-adjustable to accommodate a desired working height. In some embodiments, the desired working height is a height level with the other wing panels 107, 108 so that the adjacent wing panels 107, 108 can be connected together. More specifically, the handling fixtures 130 may include legs 134 attached to the base 133 configured to engage with the transport fixtures 130 to load and unload the panels 107,108 into the shipping fixtures 114. The legs 134 may further allow the height of the center panel 108 from the ground to be adjusted; therefore, the center panel 108 may be lined up with a wing panel 107 for attachment and assembly of the UAV 101 (see FIG. 9). A pair of support beams 136 may be attached to a leg 134 and the base 133 for additional stability of the handling fixture 130.

Figure 8A:
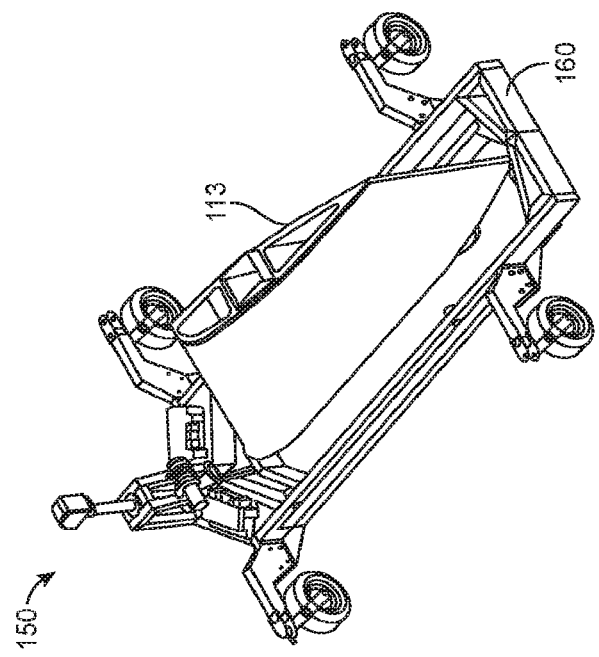
FIG. 8A depicts a dolly for transportation of the unmanned aerial vehicle of FIG. 1, according to one embodiment.
Figure 8B:
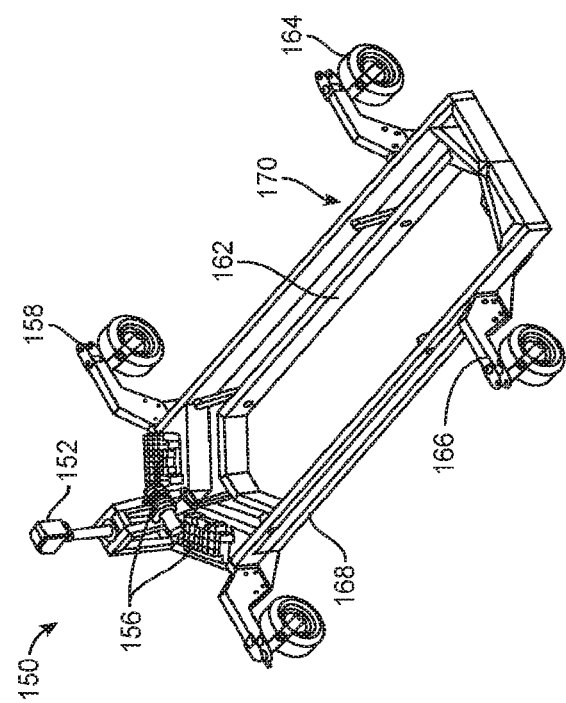
FIG. 8B depicts a landing pod connected to the dolly of FIG. 8A, according to one embodiment.

With respect to FIGS. 8A and 8B, the ground support system 100 may include at least one UAV dolly 150. The UAV dolly 150 may be used to tow the UAV 101 at the runway site 104. In one embodiment, four dollies 150 are included in the ground support system 100. In one embodiment, the UAV 101 may sit in the dollies 150 while the UAV 101 is being worked on, such as during engine tests and other diagnostics.

In one embodiment, the UAV dolly 150 may include a lift mechanism 170. The lift mechanism 170 may include a tray 162 that lowers and raises. The tray 162 may have a shape and size to accommodate a secure fit of a landing pod 113. In one embodiment, the tray 162 is of a rectangular shape with an inwardly tapered front end to accommodate the rounded nose 119 of the landing pod 113. As such, the tray 162 may act as a "nest" to cradle the landing pod 113. The tray 162 may be powered by a set of batteries 156. In one embodiment, the batteries 156 are dual lithium batteries. The dual lithium batteries may run for up to twenty hours without needing to be plugged in or recharged so as to allow time for set-up, diagnostics, or the like prior to take-off of the UAV.

In one embodiment, the dolly 150 may support a load of approximately 1,500 lbs. In other embodiments, other weight loads are possible and contemplated. For an assembled UAV 101, the four dollies 150 may collectively support a load of up to approximately 6,000 lbs.

Upon assembly of the UAV 101, the dollies 150 may transport the UAV 101 to and from the runway 104 for take-off and landing. The UAV 101 is large, yet light; therefore, it is important that when the UAV 101 is not airborne the UAV 101 is attached to the dollies 150 so the UAV 101 does not blow away, take-off unintentionally, or start to lift off of the ground. In one embodiment, the dollies may roll at a speed of 10 mph with the UAV 101, and up to approximately 25 mph without the UAV 101.

In one embodiment, the dollies 150 may allow the UAV 101 to bend and flex while towing the UAV 101 over uneven terrain. The dollies 150 may allow for transport of the UAV 101 on grass or other uneven surfaces, such as dirt or asphalt. More specifically, each dolly 150 may have a set of 4 wheels 164. The wheels 164 may be foam-filled and/or airless tires. The foam-filled airless tires 164 may be connected to a body 168 of the dolly 150 with a suspension 166. The suspension mechanism 166 may allow for the dolly 150 to bend and flex as the dolly 150 travels over uneven terrain. Furthermore, the foam-filled and/or airless tires 164 may prevent punctures to the tires 164 as the dolly 150 travels over unsmooth surfaces. In one embodiment, the wheels 164 have a steering brake 158 for improved control over the movement of the dolly 150. For example, the steering brake 158 may provide for tighter turning radius of the dolly 150. The dolly wheels 164 may be substantially wide as to prevent sticking to a grass surface. In one embodiment, the wheels 164 may not have tread so one does not have to inspect every tire for foreign object debris.

The dolly 150 may have a gate 160 that opens at the rear end of the dolly 150 for accommodating a landing pod 113, as illustrated in FIG. 8B. More specifically, and with respect to FIGS. 9A and 9B, the dolly 150 may have a winch with a tether such as a cable 154 that may be extracted for pulling a UAV, such as UAV 101 onto the dolly 150. In one embodiment, the winch 154 is extracted and secured proximate the nose 119 of the landing pod 113 in order to pull the UAV 101 onto the dolly 150. In one embodiment, the winch 154 is connected to a yoke 153. The yoke 153 may have a hook 121, where a loop at the end of the winch 154 may slide over the hook 121 for connection of the winch to the hook 121. The yoke 153 may have a general horseshoe shape with a front end of the yoke having the hook 121 connected to the winch and facing the front of the dolly 150. The shape of the yoke 153 fits around the nose 119 of the landing pod 113. The yoke 153 may have a nose wheel pin 155 for sliding through the nose wheel 117 and attaching at opposite ends of the rear of the yoke 153. Other yoke shapes are possible and contemplated. As the winch 154 pulls the landing pod 113 onto the dolly 150, the rear gate 160 is open to accommodate the landing pod 113 of the UAV 101. The ballast weight of the UAV 101, the shape of the lift tray 162, and the yoke 153 attachment to the nose wheel 117 hold the UAV 101 to the dolly 150; therefore the UAV may not be blown away as the UAV taxies on the runway or experiences high winds on the ground. Upon moving the landing pod 113, and hence the UAV 101 onto the dolly 150, the rear gate 160 may be closed to secure the landing pod 113 in the lift tray 162 of the landing pod 113 and to prevent the landing pod 113 from rolling out of the landing pod via the wheels 117. In one embodiment, the UAV 101 sits with a pitch angle of approximately 14° when the landing pods 113 are seated in the dollies 150 (as opposed to approximately 10° when the UAV 101 is in flight). The UAV may sit at a first or greater pitch angle in the landing pods 113 as compared to a second or lesser pitch angle required for flight of the UAV. As the first pitch angle is greater than the second pitch angle, the chance of the UAV unintentionally taking flight are minimized. Secured as such, the UAV 101 may stall (i.e., may not blow away) during towing/taxiing at the runway site 104 due to the large pitch angle. Furthermore, with the UAV 101 secured to the dollies 150, the UAV 101 may be loaded on an incline or decline.

Figure 10:
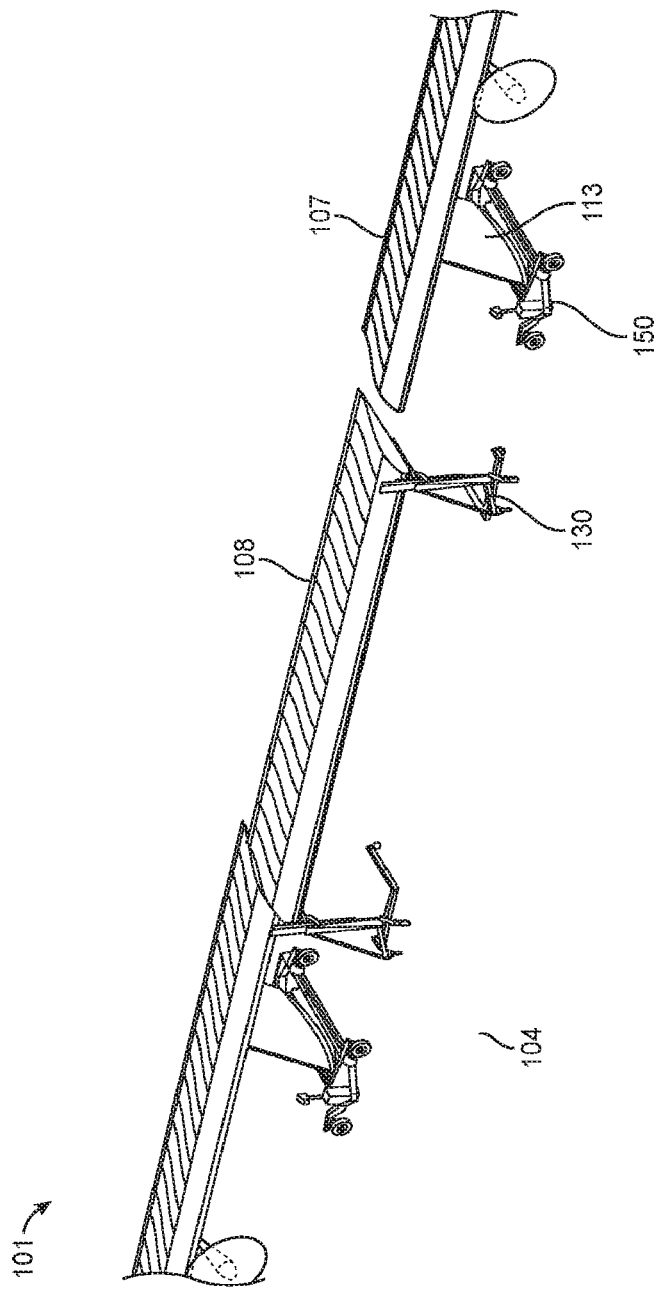
FIG. 10 depicts the unmanned aerial vehicle of FIG. 1 in an unassembled configuration, according to one embodiment.

In another embodiment, and with respect to FIG. 10, the dollies 150 may be used to help align the wing panels 107 with each other and with the center panel 108 for assembly of the UAV 101 at or near the runway site 104. More specifically, each wing panel 107 may have at least one landing pod 113, and each landing pod 113 may seat securely in a dolly 150. In some embodiments, one or more wing panels 107 may not have a landing pod 113 and may instead be supported by at least one handling fixture 130 until the wing panels 107 are connected. In some embodiments, the center panel may 108 may be supported by handling fixtures 130 instead of landing pods 113. A handling fixture 130 may be attached to each end of the center panel 108. The legs 134 of the handling fixtures 130 may adjust the height of the center panel 108 from the ground, and the lift mechanism 170 may also adjust the height of the wing panels 107. The height adjustment of the panels 107, 108 may provide for easy assembly of the UAV 101. The UAV 101 may be assembled and disassembled in parts with the dollies 150 anchored to the UAV 101. This is advantageous in instances, for example, where the UAV hangar is not large enough to store the UAV 101 in an assembled configuration.

Figure 11:
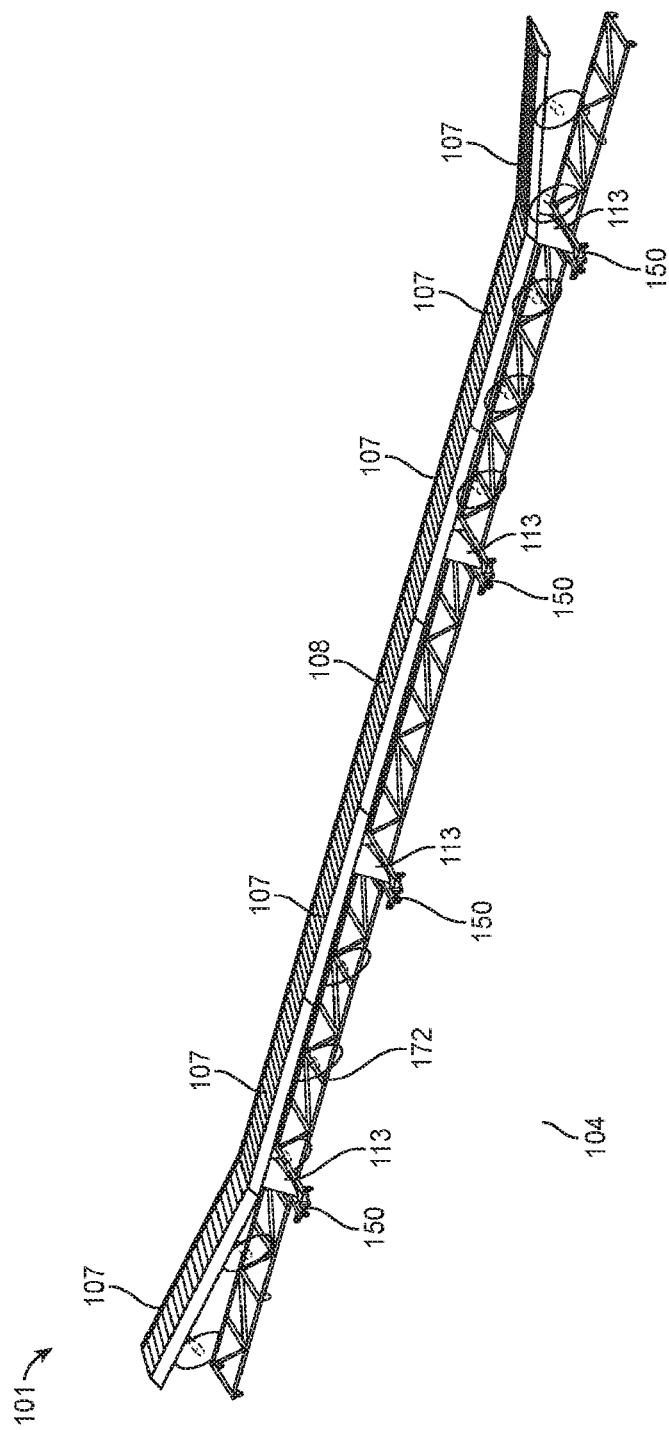
FIG. 11 depicts the unmanned aerial vehicle of FIG. 1 in an assembled configuration, according to one embodiment.

In one embodiment and with respect to FIG. 11, interconnect frames 172 may be connected to the dollies 150 for further stabilization of the UAV 101 during assembly. The interconnect frames 172 may comprise one or more frames to stabilize the UAV 101 during assembly and/or transportation to the runway site 104. In one embodiment, the interconnect frames may comprise a repeating pattern of bracing, such as repeated triangular bracing to provide support and stabilization.

Figure 12:
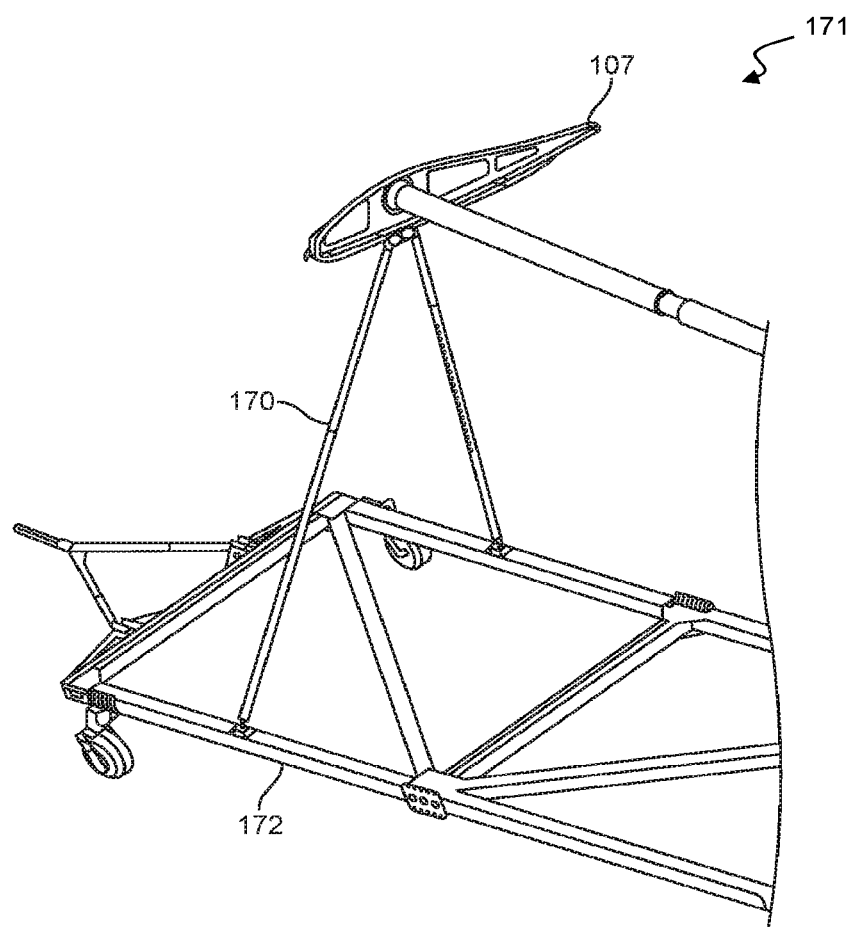
FIG. 12 depicts a wing tip assembly connected to the unmanned aerial vehicle of FIG. 1, according to one embodiment.
Figure 15:
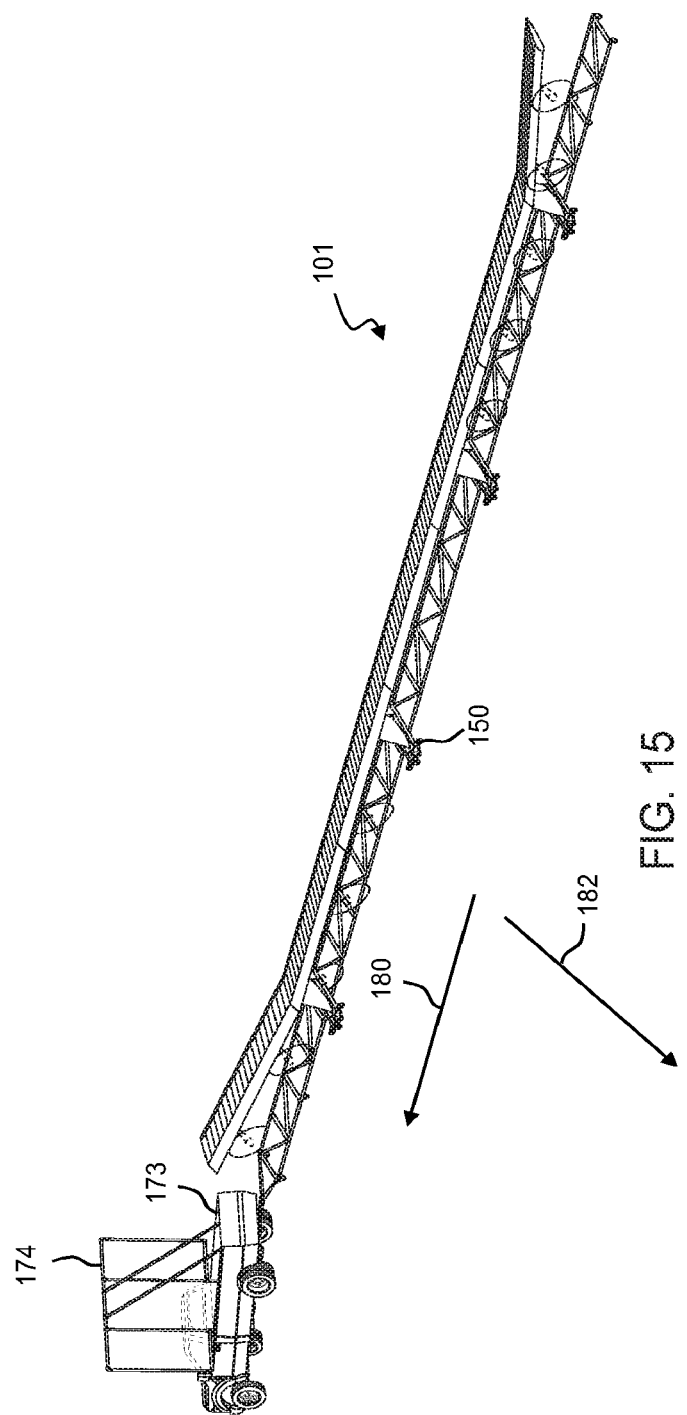
FIG. 15 depicts the vehicle of FIG. 13 towing the unmanned aerial vehicle of FIG. 1, according to one embodiment.

With respect to FIG. 12, a wing tip support assembly 171 is connected to the wing panel 170 and to the interconnect frame 172. The interconnect frames 172 combined with the wing tip support assembly 171 provide for secure and stable towing of the UAV 101. With respect to FIG. 13, a vehicle 173 tows the UAV 101 at the runway while the UAV 101 sits securely in the dollies. In one embodiment, the vehicle 173 may have a towing frame connector 176 that may connect to the interconnect frame 172. In one embodiment, the UAV 101 is towed sideways by the vehicle, as shown in FIG. 15. Towing the UAV 101 in a different direction, such as a forward direction may exert a lift force on the UAV 101 as air flows over the wings of the UAV 101. The UAV 101 may want to take off due to the UAV's 101 light payload and large wingspan. This may be exacerbated when a headwind is present. Towing the UAV 101 sideways in combination with the UAV 101 being secured to the dollies may prevent the UAV 101 from taking off. Furthermore, the UAV 101 may be substantially wider in wingspan than the width of a runway; therefore, the UAV 101 may be towed sideways.

Figure 14:
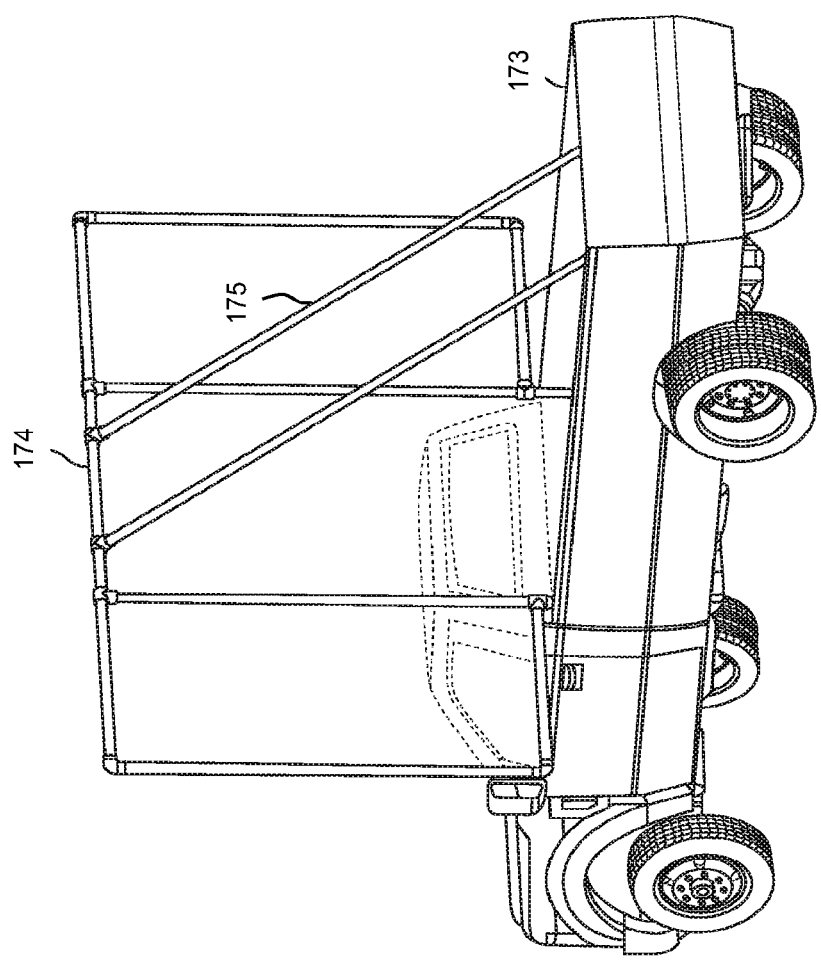
FIG. 14 depicts a wind fence attached to the vehicle of FIG. 13, according to one embodiment.

With respect to FIG. 14, a wind fence 174 is attached to the vehicle 173. The wind fence 174 may be a porous screen that may be positioned upwind of the UAV 101 to protect the UAV 101 from high winds and allow for faster towing speeds. In some embodiments, the wind screen may be secured to a truck bed of the vehicle 173 with one or more bracing 175 members. Other points of attachment are possible and contemplated including a hood, rear, tailgate, and the like of the vehicle 173. In some embodiments, the wind screen may extend beyond a width of the vehicle 173 so as to offer greater protection of the UAV from wind. The size of the wind fence 174 may be based on the size of the vehicle 173, the size of the UAV being towed, wind speed, wind direction, and weather forecasts. In some embodiments, the wind fence 174 may not be used, such as where the distance to be towed is minimal, low wind speed is recorded, and no increase in wind is forecast.

Figure 13:
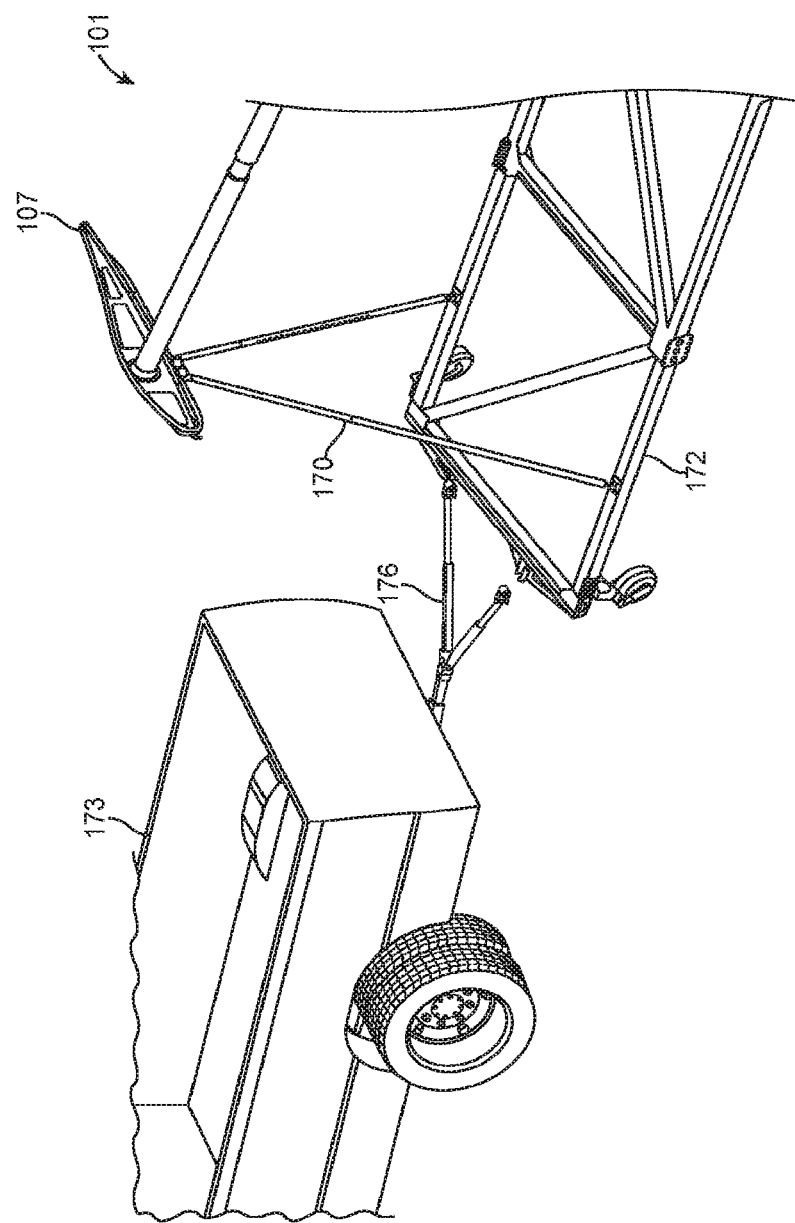
FIG. 13 depicts the unmanned aerial vehicle of FIG. 1 connected to a vehicle for towing of the unmanned aerial vehicle, according to one embodiment.

FIG. 15 depicts the vehicle 173 of FIG. 13 towing the unmanned aerial vehicle (UAV) 101 of FIG. 1, according to one embodiment. The vehicle 173 may tow the UAV 101 in a first direction 180. The first direction 180 may be perpendicular to a forward direction of flight 182 of the UAV 101. In some embodiments, the vehicle 173 may include a wind fence 174 to further protect the UAV 101 from high winds, minimize lift on the wing of the UAV 101, and/or allow for faster towing speeds. In some embodiments, the first direction 180 may be such that a wind direction is not parallel with the forward direction of flight 182 of the UAV 101 so as to avoid lift being generated from the wing of the UAV 101. The UAV 101 may be towed sideways in the first direction 180 such that the UAV 101 is being towed perpendicular to the forward direction 182 of flight of the UAV 101.

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention herein disclosed by way of examples should not be limited by the particular disclosed embodiments described above.

What is claimed is:

1. A ground support system for an unmanned aerial vehicle (UAV) comprising:
   at least one handling fixture, wherein each handling fixture is configured to support at least one wing panel of the UAV; and
   at least one dolly, wherein each dolly is configured to receive at least one landing pod of the UAV, and wherein each landing pod supports at least one wing panel of the UAV;
   wherein the at least one handling fixture and the at least one dolly are configured to move and rotate two or more wing panels to align the two or more wing panels with each other for assembly of the UAV; and
   wherein the at least one dolly further allows for transportation of the UAV over uneven terrain.

2. The ground support system of claim 1, wherein each handling fixture is fitted to a wing panel spar of the at least one wing panel.

3. The ground support system of claim 1, wherein the at least one handling fixture further comprises:
   one or more wheels attached to a base, wherein the one or more wheels allow each wing panel to be moved around for attachment to another wing panel.

4. The ground support system of claim 3, wherein the at least one handling fixture further comprises:
   one or more legs attached to the base, wherein the one or more legs are configured to engage with at least one transportation fixture for transporting the UAV, wherein each transportation fixture is configured to load and unload wing panels into a shipping fixture.

5. The ground support system of claim 1, wherein the at least one handling fixture allows each wing panel to rotate 360 degrees relative to a ground level.

6. The ground support system of claim 1, wherein the at least one handling fixture is height-adjustable to raise or lower the wing panel of the UAV to a desired working height relative to a ground level.

7. The ground support system of claim 1, wherein the UAV is secured to the at least one dolly via the at least one landing pod of the UAV.

8. The ground support system of claim 1, further comprising:
   a yoke; and
   a winch connecting the yoke to the dolly, wherein the UAV is prevented from flying via an attachment of the yoke proximate a nose of the landing pod.

9. The ground support system of claim 8, wherein the UAV is further prevented from flying based on a ballast weight of the UAV.

10. The ground support system of claim 8, further comprising:
    a lift tray of the dolly, wherein the lift tray cradles the landing pod to further prevent flying of the UAV.

11. The ground support system of claim 10, wherein the lift tray can lower or raise relative to a ground level.

12. The ground support system of claim 10, further comprising:
    a rear gate of the dolly, wherein the rear gate opens for the winch to pull the landing pod into the lift tray via the yoke, and wherein the rear gate closes to secure the landing pod in the lift tray.

13. The ground support system of claim 10, wherein the lift tray positions the wing panel of the UAV at a first pitch angle, wherein the UAV maintains a second pitch angle during flight, wherein the first pitch angle is greater than the second pitch angle, and wherein the first pitch angle decreases a chance that the UAV will unintentionally take flight.

14. The ground support system of claim 13, wherein the first pitch angle would cause the UAV to stall if the UAV takes off unintentionally.

15. The ground support system of claim 13, wherein the first pitch angle is about 14°, and wherein the second pitch angle is about 10°.

16. The ground support system of claim 1, further comprising:
    at least one interconnect frame connected between each dolly, wherein each interconnect frame stabilizes the UAV after assembly and during transportation of the UAV.

17. The ground support system of claim 16, further comprising:
    a towing frame connector configured to connect to the at least one interconnect frame, wherein the towing frame connector is configured to connect to a vehicle such that the vehicle can tow the UAV to a runway site.

18. The ground support system of claim 17, wherein the UAV is towed sideways by the vehicle.

19. The ground support system of claim 17, wherein the UAV is towed by the vehicle in a first direction, wherein the first direction is perpendicular to a forward direction of flight of the UAV, and wherein towing in the first direction decreases a chance that the UAV will unintentionally take flight.

20. The ground support system of claim 17, further comprising:
  a wind fence attached to the vehicle, wherein the wind fence comprises a porous screen that protects the UAV from high winds during towing and allows for faster towing speeds.

\* \* \* \* \*